No. 692,696. Patented Feb. 4, 1902.
H. McCORNACK.
MECHANICAL MOVEMENT.
(Application filed May 10, 1897.)
(No Model.) 2 Sheets—Sheet 1.

Witnesses:
Charles De Cou.
F. E. Bechtold.

Inventor
Herbert McCornack,
by his Attorneys

No. 692,696. Patented Feb. 4, 1902.
H. McCORNACK.
MECHANICAL MOVEMENT.
(Application filed May 10, 1897.)

(No Model.) 2 Sheets—Sheet 2.

Witnesses:
Charles DeCou
F. E. Bechtold

Inventor:
Herbert McCornack
by his Attorneys
Howson & Howson

UNITED STATES PATENT OFFICE.

HERBERT McCORNACK, OF WESTCHESTER, PENNSYLVANIA.

MECHANICAL MOVEMENT.

SPECIFICATION forming part of Letters Patent No. 692,696, dated February 4, 1902.

Application filed May 10, 1897. Serial No. 635,882. (No model.)

*To all whom it may concern:*

Be it known that I, HERBERT McCORNACK, a citizen of the United States, and a resident of Westchester, Chester county, Pennsylvania, have invented certain Improvements in Mechanical Movements, of which the following is a specification.

My invention consists of a certain combination of mechanism constituting a novel mechanical movement whereby the speed of a rotary movement may be greatly increased or decreased or a rotary movement may be transformed into a rapid vibrating, oscillating, or reciprocating movement or the reverse.

Figure 1:
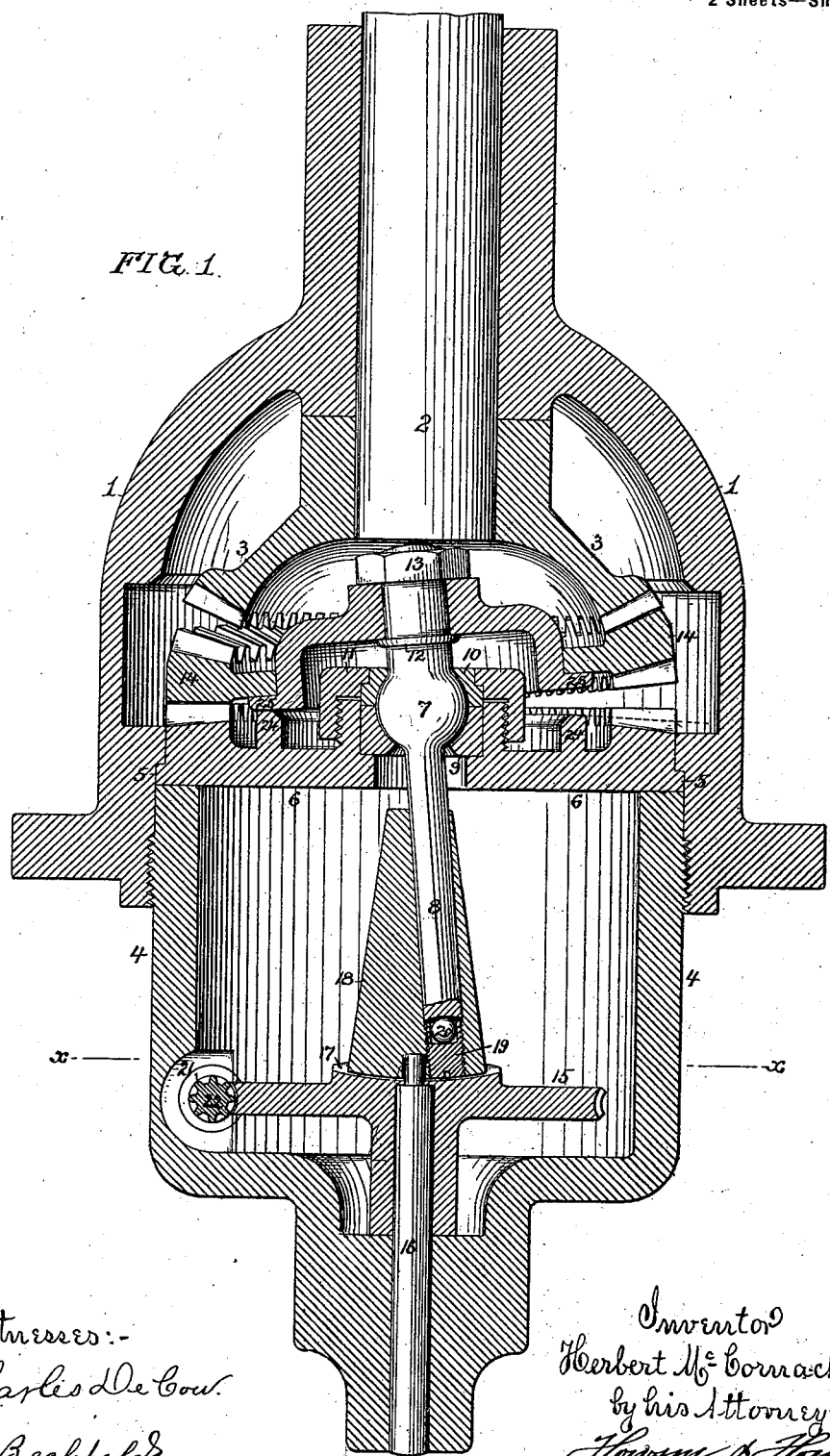
Figure 2:
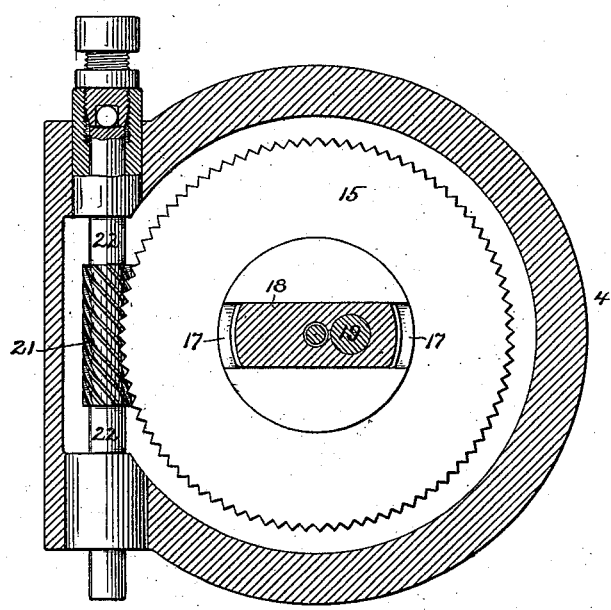

In the accompanying drawings, Figure 1 is a vertical section of a mechanical-movement device embodying my invention; and Fig. 2 is a sectional plan view of part of the same on the line $x\,x$, Fig. 1.

I will first describe the device as a means of increasing the speed of rotary movement or transforming such movement into movement of a different character.

In Fig. 1 is shown a box or casing 1, which has a suitable bearing for a shaft 2, said shaft constituting the driving-shaft of the device and having at its lower end a bevel-wheel 3, hereinafter termed the "rotating gear."

Screwing into or otherwise attached to the lower portion of the casing 1 is another casing 4, between which and a shoulder in said casing 1 is confined a flange 5 on a bevel-wheel 6, hereinafter termed the "fixed gear," which faces the rotating gear 3, but is located at some distance therefrom, so as to provide a space between the two, said fixed gear 6 being immovably held in position in the lower portion of the casing 1. In the hub of said fixed gear 6 is a bearing for a spherical enlargement or ball 7 upon a shaft 8, said bearing consisting of a lower block 9, adapted to a seat in the hub of the fixed gear 6, and an upper block 10, confined in place by a cap 11, screwed into said hub.

To the shaft 8 is rigidly secured, by means of a flange or collar 12 and nut 13, a duplex wabble gear-wheel 14, having teeth adapted to mesh with the teeth of the rotating gear 3 and other teeth adapted to mesh with the teeth of the fixed gear 6. The axis of the shaft 8 is inclined in respect to the axis of the shaft 2, so that when the wabble-gear 14 is in full mesh with the rotating gear 3 at one side it is at the same side free from mesh with the fixed gear 6, while at a diametrically opposite point the wabble-gear 14 is free from mesh with the rotating gear 3 and is in full mesh with the fixed gear 6. The wabble-gear 14 being thus prevented from turning by reason of its engagement with the fixed gear 6, the effect of the rotation of the rotating gear 3 is to cause the oscillation of said wabble gear-wheel. As the wabble-gear moves downward at one side it rises at the other side. Hence one or more of its teeth are always in full mesh with the rotating gear 3, the point of operative engagement traveling around the wabble-gear as the latter swings. There is a difference of one or more teeth in the intermeshing portions of the wabble-gear and rotating gear. On each rotation of the shaft 2 there will be as many complete oscillations of the wabble-gear 14 as there are teeth in the rotating gear 3, and the lower end of the shaft 8 will describe a complete circle for each oscillation of the wabble-gear, and this circular movement of the lower end of the shaft 8 may cause rotary, oscillating, vibrating, or reciprocating movement of the part to be driven by proper mechanical connection with said driven part, or the movement of the wabble-gear may be transformed into rotary or other movement by many devices within the knowledge of the skilled mechanic.

As shown in the drawings, the device is designed to impart rotary movement to a wheel 15, which is mounted so as to be free to rotate upon a stud 16 and has in its upper face a transverse groove or slot 17, with which engages the lower portion of a shoe 18, having therein an opening for the reception of the shaft 8, a screw-plug 19 at the lower end of said opening having a recess for the reception of a ball 20, upon which the lower end of the shaft 8 bears. As the shaft 8 swings through its circular path, therefore, the shoe 18 is caused to rotate around an axis coincident with that of the wheel 15, and hence imparts rotary movement to said wheel. The upper end of the stud 16 projects into an axial opening in the lower end of the shoe 18 and serves to vertically support the shoe and to properly center the same and maintain the axis of the wabble-gear shaft in its proper angular relation to the axis of the driving-shaft, thus preventing the wabble-gear from assuming a position where it is not properly in mesh with the rotating gear. The opening formed in the lower end of the shoe 18 is slightly greater in diameter than the projecting upper end of the stud 16, so as to prevent the transmission of vibrations from the wabble-gear shaft to the stud or wheel 15.

As shown in the drawings, the high-speed shaft is a shaft 22, which is driven by the wheel 15, the latter having around its periphery inclined teeth engaging with a spiral gear 21 on said shaft 22, which is mounted in suitable bearings at one side of the casing 4. This, however, forms no essential part of my invention.

On the fixed gear 6 is a projecting ring 24, the upper face of which lies in the pitch-cone of said fixed gear, as shown by the dotted lines $w$ in Fig. 1, and as the wabble-gear oscillates its under face 25 rolls on the upper face of the ring 24, so as to provide a bearing-surface which limits the approach of the two gears and governs the meshing of the teeth.

I have shown the wabble-gear 14 as composed of a toothed rim fixedly mounted upon an independent center or hub; but it will be evident that the gear may be made in one piece, if desired.

In carrying out my invention the combination of rotating gear, fixed gear, and wabble-gear may be used in connection with any desired form of universal mounting for the wabble-gear, and, on the other hand, the ball-and-socket bearing for the wabble-gear shaft may be employed when means other than the fixed gear is used to prevent rotation of said wabble-gear.

It will be evident that the device which forms the subject of my invention may be used in a manner directly the reverse of that which I have described—that is to say, for decreasing instead of increasing speed of rotary movement or for transforming into rotary movement movement of a different character. For instance, in the construction shown in the drawings the shaft 22 might be the driving-shaft and the shaft 2 the driven shaft. It will be evident also that, considering the great increase or decrease of speed obtained, the mechanical movement constituting the subject of my invention is extremely strong and compact. Hence my invention is available for use in all cases where these qualities are desired.

Having thus described my invention, I claim and desire to secure by Letters Patent—

1. A mechanical movement in which are combined a rotating gear, a fixed gear facing the same, a universally-mounted shaft having an axis inclined in respect to the axis of the shaft which drives the rotating gear, and a duplex wabble-gear secured to said inclined shaft so as to swing between the rotating gear and the fixed gear and mesh with one on one side of its center and with the other on the opposite side of its center, whereby the swinging movement of the wabble-gear is caused by the action of the teeth of the gears with which it meshes, substantially as specified.

2. A mechanical movement in which are combined a rotating gear, a wabble-gear adapted to mesh therewith, provision for preventing rotation of said wabble-gear, a wabble-gear shaft mounted so as to swing in any direction, a shoe mounted upon said wabble-gear shaft, and a wheel with which said shoe engages the axis of the wabble-gear shaft being inclined in respect to the axis of the said wheel, substantially as specified.

3. A mechanical movement in which are combined a rotating gear, a wabble-gear meshing therewith, provision for preventing rotation of said wabble-gear, a wabble-gear shaft mounted so as to be free to swing in any direction, a shoe mounted upon said shaft, a wheel with which said shoe engages, and a centering pin or projection entering an opening in said shoe in line with the axis of the said wheel.

4. A mechanical movement in which are combined a wabble-gear and a gear meshing therewith, said gears having bearing contact independent of the toothed portions of the gears but exerting no pressure upon the wabble-gear to cause swinging movement of the same, substantially as specified.

5. A mechanical movement in which are combined a wabble-gear, a gear meshing therewith, and bearing contact independent of the teeth of the gears and serving to restrict the approach of the latter, said bearing contact lying in the pitch-cone of the gear with which the wabble-gear engages.

6. A mechanical movement in which are combined a rotating gear, a fixed gear opposed thereto, a wabble-gear swinging between the two, and a bearing contact for said wabble-gear, independent of the teeth of the gears, and lying in the pitch-cone of said fixed gear.

In testimony whereof I have signed my name to this specification in the presence of two subscribing witnesses.

HERBERT McCORNACK.

Witnesses:
NELLIE M. LACEY,
WM. S. WINDLE.